United States Patent [19]

Blackborow

[11] Patent Number: 5,637,651
[45] Date of Patent: Jun. 10, 1997

[54] PROCESS FOR MODIFYING A POLYOLEFIN

[75] Inventor: John R. Blackborow, Edinburgh, Scotland

[73] Assignee: BP Chemicals Limited, London, England

[21] Appl. No.: 521,823

[22] Filed: Aug. 31, 1995

[30] Foreign Application Priority Data

Sep. 8, 1994 [FR] France .................................. 9410940

[51] Int. Cl.$^6$ ........................................ C08F 8/30
[52] U.S. Cl. .................. 525/374; 525/333.7; 525/376
[58] Field of Search ..................... 525/374, 376

[56] References Cited

U.S. PATENT DOCUMENTS 3,284,421 11/1966 Breslow .
3,723,405 3/1973 Kaplan et al. .
4,309,453 1/1982 Reiner et al. .

FOREIGN PATENT DOCUMENTS

| 0014843 | 3/1980 | European Pat. Off. . |
| 1436138 | 1/1966 | France . |
| 1217619 | 5/1966 | Germany . |
| 976320 | 11/1964 | United Kingdom . |
| 980160 | 1/1965 | United Kingdom . |
| 1043025 | 9/1966 | United Kingdom . |

*Primary Examiner*—Bernard Lipman
*Attorney, Agent, or Firm*—Brooks Haidt Haffner & Delahunty

[57] ABSTRACT

This invention relates to a process for modifying a polyolefin having 10 to 120 carbon atoms and in which the unsaturated groups are predominantly of the vinylidene type ($=CH_2$) said process comprising bringing the polyolefin into contact with a generator of carbenes or of nitrenes in an addition reaction in order to enable the carbenes or the nitrenes to add across the vinylidene unsaturation of the polyolefin. The products can be used as lubricating oil and fuel additives.

7 Claims, No Drawings

PROCESS FOR MODIFYING A POLYOLEFIN

The present invention relates to a process for modifying a polyolefin having terminal unsaturation and in particular a terminally unsaturated polypropylene or polybutene.

It is known to modify a polybutene by reacting with maleic anhydride to form a succinic anhydride having a chain derived from the polybutene. However, this reaction has the disadvantage of having to be carried out at relatively high temperatures.

It is the object of the present invention to devise a process for modifying a polyolefin which is carried out at a relatively moderate temperatures.

Accordingly, the present invention is a process for modifying a polyolefin having 10 to 120 carbon atoms and in which the unsaturated groups are predominantly of the vinylidene type ($=CH_2$) said process comprising bringing the polyolefin into contact with a generator of carbenes or of nitrenes in an addition reaction in order to enable the carbenes or the nitrenes to add across the vinylidene unsaturation of the polyolefin.

By the expression "the unsaturated groups are predominantly of the vinylidene type ($=CH_2$)" as used herein and throughout the specification is meant that more than 50% of the unsaturated groups in the polyolefins are of the vinylidene type. Polyolefins which predominate in the vinylidene type unsaturation are different in their reactivity from conventional polyolefins which usually have less than 50% of the unsaturated linkages in the terminal unsaturation. Methods of preparing such polyolefins in which the unsaturated linkages are predominantly of the vinylidene type (the so-called "terminally unsaturated polyolefins") are well known. The polyolefin is suitably a polypropylene or a polybutene and is preferably a polybutene. A typical example of such a polyolefin is the polyisobutene (hereafter "PIB") ULTRAVIS® (ex BP Chemicals Ltd) and a process for producing this polymer is claimed and described in our published EP-A-145235. ULTRAVIS® can be produced in grades which have a terminal unsaturation (ie $=CH_2$ end group) content of over 60% and in Mn ranging from 750–5000. Such PIBs can be produced substantially free of chlorine by the process described in our published EP-A-145235. Such PIBs are different from most commercial polybutenes which have less than 20% of vinylidene type unsaturation.

The preferred polyolefins used in the present invention have a number average molecular weight (hereafter "Mn") in the range from 160–1500 as measured by gel permeation chromatography. Use of such relatively low molecular weight polyolefins promotes the addition reaction of the carbenes or of the nitrenes across the double bonds and prevent any grafting reaction thereof on the polyolefin. Where a polybutene is used, it suitably has from 12 to 120 carbon atoms, preferably from 12 to 80 carbon atoms. It can have a viscosity, measured at 100° C., ranging from 0.001 to 100 Pa.s. Moreover, it can have a relatively narrow molecular mass distribution. This distribution, calculated by the ratio of the weight-average molecular mass $M_w$ to the number average molecular mass $M_n$, can range from 1 to 5 and preferably from 1 to 3.

The generator of the carbene used as a reactant in the process of the present invention can be a diazo compound of the formula $R^1—CHN_2$ in which $R^1$ is an organic radical. This organic radical can advantageously contain a functional group and, in particular, a functional group capable of reacting with an amine such as, for example, an acid or ester functional group. The nitrene generator can be an azide having the formula $R^2—N_3$ in which the $R^2$ radical is an organic radical and preferably an aromatic radical. Like the $R^1$ radical, it can contain a functional group capable of reacting with an amine. In the process, 1 to 2 mol of generator is/are used per mole of polyolefin.

According to the process of the invention, the generator decomposes to generate molecular nitrogen and carbenes or nitrenes and addition of the carbene or of the nitrene across the carbon-carbon double bond of the polyolefin takes place. During this reaction, the carbene addition results in a 3 carbon atoms ring whereas nitrene addition results in a ring containing 2 carbon atoms and 1 nitrogen atom. Thus, the reaction product comprises a compound having a ring containing 3 atoms, at least two of which are carbon atoms, substituted by a hydrocarbon chain derived from the polyolefin reactant. The decomposition of a diazo compound to generate the nitrene is advantageously carried out in the presence of a catalyst such as copper powder.

The polyolefin and the generator can be brought into contact in a hydrocarbon solvent such as n-hexane. This is carried out at a temperature generally ranging from 50° to 200° C., suitably less than 200° C. in order to avoid any grafting reaction of the generator onto the polyolefin. The duration of the reaction is suitably in the range from 10 minutes to 5 hours. In order to avoid a reaction between the carbenes or between the nitrenes themselves, and to promote the reaction of these with the polyolefin, the generator is preferably used in the reaction mixture in a low concentration. It can also be added to the reaction mixture throughout the reaction.

When the generator contains a functional group capable of reacting with an amine, the process can comprise a second stage, during which the chemical compound resulting from the reaction with the generator is reacted with an amine to form an amide with a long chain alkyl substituent. This reaction is generally carried out in a hydrocarbon solvent such as n-hexane. In order to increase the yield of the amide, the solvent is suitably chosen to form an azeotrope with the water of the reaction. This reaction with an amine is suitably carried out at atmospheric pressure and at a temperature in the range from 50° C. to 250° C. The duration of the reaction is suitably in the range from 1 to 20 hours. The amine used for this reaction is suitably a monoamine or a polyamine. A list of amines that may be used is recited in French Patent Application No. 2,677,644. At the end of the reaction with an amine, the amide formed has a ring containing 3 atoms, at least two of which are carbon atoms, substituted by a hydrocarbon chain derived from the reactant polyolefin.

The amide can advantageously be used as a dispersion additive in oils or in fuels.

The present invention is further illustrated by the following Examples.

EXAMPLE 1

The following were introduced into a 0.5 liter glass reactor equipped with a stirrer rotating at 300 rpm and heated to 100° C.:

200 g of ULTRAVIS® polybutene (ex BP Chemicals Limited), having a number- average molecular mass of 162 g, 5 g of copper powder as catalyst, and 10 g of ethyl diazoacetate $N_2=CHCO_2CH_2CH_3$ over 1 hour. At the end of this duration, the reactor was cooled to room temperature and n-hexane was added thereto. The mixture obtained was filtered and then distilled under vacuum in order to remove the n-hexane and any unreacted polybutene and a functionalized polybutene was thus obtained. The absence of the carbon-carbon double bonds of vinylidene type in the product was confirmed by infrared spectroscopy.

The product as formed is a substituted cyclopropane derivative of polybutene; C1 has the substituents H and carboxyethyl, and C3 has the substituents methyl and polyisobutenyl. C1 and C3 are chiral centres. The gas chromatogram of the product showed two peaks of equal intensity corresponding to the two sets of isomers with the C3 methyl and the C1 carboxyethyl substituents either having a cis or trans configuration with respect to each other. These structures are illustrated below:

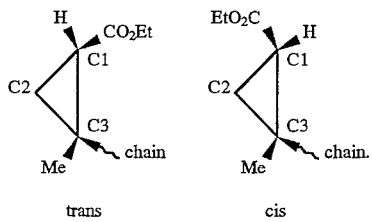

9.5 g of functionalised polybutene obtained above and 3 g of N-hydroxy-2ethylethylenediamine were reacted at 170° C. for 6 hours in a glass reactor with a volume of 50 ml. At the end of this duration, the reactor was cooled to room temperature and the excess unused amine was removed under vacuum. A polymer derived from the polybutene, containing 2% by weight of nitrogen, was thus obtained.

EXAMPLE 2

200 g of ULTRAVIS® polybutene (ex BP Chemicals Limited) having a number-average molecular mass of 350 g and 9.9 g of benzoic acid para-azide are introduced into a 0.5 liter glass reactor equipped with a stirrer system rotating at 300 rpm and heated to 190° C., the azide being added to the reactor over 15 minutes. The reaction mixture was maintained under a nitrogen atmosphere. The appearance of a brown coloration was observed during introduction of the benzoic acid and nitrogen gas was evolved. The reaction mixture was kept stirred for a further 5 minutes and was then cooled. The product recovered was analyzed by infrared spectroscopy and complete absence of the carbon-carbon double bonds in the product was confirmed, and no indication of NH vibrations.

I claim:

1. A process for modifying a polyolefin having 10 to 120 carbon atoms and in which the unsaturated groups are predominantly of the vinylidene type ($=CH_2$) said process comprising bringing the polyolefin into contact with a generator of carbenes or of nitrenes in an addition reaction in order to enable the carbenes or the nitrenes to add across the vinylidene unsaturation of the polyolefin.

2. A process according to claim 1 wherein the polyolefin is a polypropylene or a polybutene.

3. A process according to claim 1, wherein the generator is a diazo compound or an azide.

4. A process according to claim 1 wherein the generator contains a functional group capable of reacting with an amine.

5. A process according to claim 1 wherein the said polyolefin has a number average molecular weight ($M_n$) in the range from 160–1500 as measured by gel permeation chromatography and the reaction is carried out at atmospheric pressure and a temperature in the range of from 50° C. to 200° C.

6. A process according to claim 5 wherein the generator of carbenes is ethyl diazoacetate.

7. A process according to claim 5 wherein the generator of nitrenes is benzoic acid para-azide.

* * * * *